(12) United States Patent
Adas et al.

(10) Patent No.: US 6,661,795 B1
(45) Date of Patent: Dec. 9, 2003

(54) METHOD AND APPARATUS FOR EFFICIENT SIGNALING IN AN ATM ENVIRONMENT

(75) Inventors: Abdelnaser Adas, Newport Beach, CA (US); Joel Peshkin, Irvine, CA (US); Shahram Famorzadeh, Newport Beach, CA (US); Richard Burns, Superior, CO (US); Warner Andrews, Boulder, CO (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/201,172

(22) Filed: Nov. 30, 1998

(51) Int. Cl.7 .............................................. H04L 12/28
(52) U.S. Cl. .................... 370/395.1; 370/397; 370/522; 370/535
(58) Field of Search .............................. 370/397, 399, 370/389, 395.2, 390, 395.3, 395.31, 401, 395.63, 410, 395.21, 465, 522, 535, 409; 709/227; 379/93.01, 93.05

(56) References Cited

U.S. PATENT DOCUMENTS

| | | | |
|---|---|---|---|
| 5,339,318 A | | 8/1994 | Tanaka et al. |
| 5,414,701 A | | 5/1995 | Shtayer et al. |
| 5,583,863 A | * | 12/1996 | Darr, Jr. et al. ............. 370/397 |
| 5,629,928 A | | 5/1997 | Calvignac et al. |
| 5,745,488 A | | 4/1998 | Thompson et al. |
| 5,999,532 A | * | 12/1999 | Terasaki .................. 370/395.3 |
| 6,069,879 A | * | 5/2000 | Chatter ....................... 370/295 |
| 6,195,352 B1 | * | 2/2001 | Cushman et al. ........... 370/395 |
| 6,246,695 B1 | * | 6/2001 | Seazholtz et al. ........... 370/466 |

OTHER PUBLICATIONS

Kwok, *ATM: The New Paradigm for Internet, Intranet and Residential Broadband Services and Applications*, Ch, 13, pp. 285–308, Prentice Hall, Sep. 1997.

* cited by examiner

Primary Examiner—Chi Pham
Assistant Examiner—Alexander O. Boakye
(74) Attorney, Agent, or Firm—Keith Kind; Kelly H. Hale

(57) ABSTRACT

A signaling technique for use with an asynchronous transfer mode (ATM) over asymmetric digital subscriber line (ADSL) system is disclosed. The ATM over ADSL system employs an ATM multiplexer (MUX) operatively connected to a number of downstream ATM devices and operatively connected to an upstream ATM switch. The MUX is configured to receive and process upstream setup messages that originate from the downstream ATM devices. In response to an upstream message cell, the MUX compares the call reference number (CRN) contained in the setup message with a table of CRN values associated with other calls. If necessary, the MUX assigns a new CRN value to the current setup message such that the current connection with the originating downstream device is uniquely identified by the assigned CRN. The MUX uses a CRN mapping table to facilitate the unambiguous downstream routing of subsequent signaling cells. In this manner, the MUX can output ATM cells associated with a very large number of concurrent downstream users over a single link devoted to the ATM switch.

12 Claims, 7 Drawing Sheets

| REC'D CRN | D.S. PORT | ASS'D CRN | D.S. VPI | D.S. VCI |
|---|---|---|---|---|
| 100 | 1 | 100 | 33 | 456 |
| 150 | 1 | 150 | 47 | 819 |
| 210 | 1 | 210 | 52 | 341 |
| 130 | 2 | 130 | 98 | 111 |
| 150 | 2 | 160 | 14 | 298 |
| 200 | 2 | 200 | 27 | 411 |
| 210 | 2 | 215 | 72 | 818 |
| 130 | 1 | 180 | 18 | 165 |

| REC'D CRN | D.S. PORT | D.S. VPI | D.S. VCI | ASS'D CRN | U.S. PORT | U.S. VPI | U.S. VCI |
|---|---|---|---|---|---|---|---|
| 180 | 5 | 18 | 165 | 846 | 6 | 30 | 154 |
| 100 | 5 | 33 | 465 | 102 | 6 | 41 | 139 |
| ⋮ | ⋮ | ⋮ | ⋮ | ⋮ | ⋮ | ⋮ | ⋮ |

*FIG. 8*

METHOD AND APPARATUS FOR EFFICIENT SIGNALING IN AN ATM ENVIRONMENT

FIELD OF THE INVENTION

The present invention relates generally to asynchronous transfer mode (ATM) networks. More particularly, the present invention relates to signaling techniques employed by ATM networks. Specifically, the present invention relates to signaling techniques that facilitate the efficient handling of concurrent ATM signaling cells over a single connecting link associated with an ATM switch.

BACKGROUND OF THE INVENTION

ATM is a virtual connection oriented technique that may be employed as a low level operating protocol in conjunction with a higher level operating protocol or physical layer such as the internet protocol (IP), an asymmetric digital subscriber line (ADSL) system, or the like. Unlike the conventional public switched telephone network (PSTN), an end-to-end ATM connection is not uniquely associated with a devoted connection circuit. Rather, an end-to-end ATM transmission is associated with a virtual connection that may share one or more switched communication links with any number of other virtual connections. FIG. 1 depicts a portion of a typical ATM virtual connection that links a first ATM end device, e.g., a first personal computer (PC) 100, to a second ATM end device, e.g., a second PC 102.

A typical ATM network 104 may include a first ATM switch 106 and a second ATM switch 108. In a practical network, any number of additional ATM switches may be present to facilitate the establishment of virtual connections between a plurality of ATM end devices. For example, a practical network may include one or more additional ATM switches operatively coupled between ATM switch 106 and ATM switch 108. In accordance with conventional techniques, a virtual circuit connection (VCC) between first PC 100 and second PC 102 is established during a signaling procedure. Signaling between first PC 100 and first ATM switch 106 (and between second PC 102 and second ATM switch 108) is typically performed in accordance with the UNI 3.1 Specification or the UNI 4.0 Specification (both published by the ATM Forum). The entire content of both of these UNI Specifications is hereby incorporated by reference. Signaling between ATM switches is typically performed in accordance with various NNI (network to network interface) protocols. The UNI 3.1, UNI 4.0, and NNI protocols are known to those skilled in the art and, accordingly, will not be described in detail herein.

According to current conventions, ATM cells contain 53 bytes (one byte includes eight bits) of information; five of the bytes are employed as a header while the remaining bytes contain the payload or data. The header information conveys a connection identifier that includes a virtual path identifier (VPI) and a virtual circuit identifier (VCI). In conventional ATM networks, the VPI at the user to network interface (the interface between an ATM end device and an ATM network) is eight bits long (occupying one byte) and the VCI is 16 bits long (occupying two bytes). During the normal data transmission mode, the VPI and VCI values are utilized to identify where the given ATM cell is to be routed throughout the ATM network. Different VPI and VCI values may be utilized between ATM switches and between ATM switches and ATM end devices. If an ATM cell is a signaling cell, then a predetermined VCI value (and possibly a predetermined VPI value) is used to identify that the cell contains signaling information rather than data. For example, in accordance with the UNI 3.1 Specification, signaling cells include VPI=0 and VCI=5; the UNI 4.0 Specification only requires that signaling cells include VCI=5. These aspects of ATM signaling are described in more detail below.

ATM signaling messages may include one or more ATM cells. Accordingly, a given control task or other function that is to be carried out by way of signaling may require the transmission of a plurality of cells. For example, ATM Adaption Layer 5 (AAL 5) and the service-specific connection-oriented protocol (SSCOP) provides mechanisms for the reliable transmission of signaling messages.

In the exemplary system shown in FIG. 1, first ATM switch 106 is associated with a table 110 of VPI and VCI values (the table is used for the transfer of data rather than for signaling purposes). As shown in table 110, an ATM cell from first PC 100 may be received by first ATM switch 106 on its port 1. This cell may be associated with the values VPI=10 and VCI=100. As described in more detail below, the particular VPI and VCI values assigned to a given connection are established by the respective ATM switch during signaling. These values of VPI and VCI are utilized by first ATM switch 106 to determine where to route the current ATM cell. In other words, for a specific combination of VPI, VCI, and an input port number, table 110 indicates where the cell is to be routed. Thus, first ATM switch 106 may modify the virtual connection values such that VPI=10 and VCI=150 before outputting the cell onto port 2 (by way of a prior signaling procedure, first ATM switch 106 knows that the given cell is to be routed to second ATM switch 108 via the virtual connection shown in FIG. 1).

Assuming that no intervening ATM switches are present between first ATM switch 106 and second ATM switch 108, the cell will eventually be received on input port 4 of second ATM switch 108. As shown in a table 112 associated with second ATM switch 108, if second ATM switch 108 receives a cell with VPI=10 and VCI=150 on input port 4, then it determines that the cell is to be routed to second PC 102 via output port 3. Accordingly, second ATM switch 108 changes the virtual connection values to VPI=20 and VCI=50, and makes the cell available on output port 3.

Eventually, second PC 102 obtains the cell from second ATM switch 108 and, by processing the VPI and VCI values, determines that the cell payload contains information associated with a specific application. A similar technique may be utilized to transmit information from second PC 102 to first PC 100.

In a practical ATM network, any given ATM switch may be coupled to a plurality of ATM end devices and/or to a plurality of other ATM switches. Furthermore, one ATM end device, e.g., first PC 100, may be virtually connected to a number of different ATM entities via a single physical link (between first PC 100 and a single input port associated with first ATM switch 106). Consequently, the ATM switches may be configured as complex fabrics capable of receiving, processing, managing, and routing a large number of ATM cells associated with many different ATM end devices. To this end, tables 110 and 112 in FIG. 1 may include any number of vertical entries that uniquely associate specific input ports, output ports, and virtual connection values (the particular layout of tables 110 and 112 may vary according to the specific application).

As mentioned above, the tables employed by the ATM switches may be constructed "on-demand" during a signaling procedure associated with the establishment of each virtual connection. (The "manual" construction of tables associated with permanent virtual connections are not described herein). Since ATM connections are established before data cells are transmitted, signaling channels are initialized prior to the transmission of messages. As stated above, the details of ATM signaling are known to those familiar with ATM networks. For example, Onvural and Cherukuri, SIGNALING IN ATM NETWORKS (Artech House, 1997) contains a detailed explanation of ATM signaling procedures and specific signaling message formats. The entire content of this book is incorporated herein by reference.

Briefly, the UNI 3.1 signaling protocol dictates that ATM signaling cells must be identified by the following virtual connection identifier: VPI=0 and VCI=5. Thus, whenever an ATM switch or an ATM end device receives a cell with VPI=0 and VCI=5, it will recognize the cell as a signaling cell and process the payload information accordingly. During signaling, a particular ATM interface connection is uniquely identified by a three-byte call reference number (CRN); the CRN is contained in the payload of the signaling message. For example, the connection from first PC 100 to first ATM switch 106 may be uniquely identified by a first CRN, the connection from first ATM switch 106 to second ATM switch 108 may be uniquely identified by a second CRN, and the connection from second ATM switch 108 to second PC 102 may be uniquely identified by a third CRN. In addition, a number of virtual connections with any one end device via a single link may be uniquely identified by a like number of different CRNs. The different CRNs may be associated with one another at the ATM interfaces via CRN mapping or translation tables.

A signaling message may contain the following information: the called party number (or address), the calling party number (or address), the CRN, a CRN flag bit, tentative VPI and VCI values, and any number of control instructions (e.g., SETUP, ACKNOWLEDGE, CONNECT, RELEASE). Of course, depending upon the origination and purposes of the particular signaling message, the amount and type of information may vary. FIG. 2 shows an exemplary UNI 3.1 signaling message 200 with several of these of information fields. For convenience, message 200 is depicted as a one-cell signaling message. In response to a setup message (which is one type of signaling message), an ATM switch will establish a tentative virtual connection and switch the signaling message in an appropriate manner. An exemplary ATM setup procedure, in the context of the network shown in FIG. 1, is described below.

With continued reference to FIG. 1, upon initialization, first and second PCS 100 and 102 register their ATM addresses with first and second ATM switches 106 and 108, respectively. In this context, the ATM addresses are akin to telephone numbers that uniquely identify the ATM end devices. In current ATM systems, the ATM address is defined by a network prefix supplied by the ATM switch and a user part supplied by the end devices. Thus, a specific combination of an ATM network prefix and an ATM user part identifies each ATM end device. In accordance with the UNI Specifications, the ATM end devices and their associated ATM switches employ the ILMI (interim local management interface) protocol to exchange ATM network prefixes and ATM user parts. After registration, ATM switch 106 knows the address of first PC 100 and ATM switch 106 knows that first PC 100 is connected via port 1. Similarly, after registration, ATM switch 108 knows the address of second PC 102 and that second PC 102 is connected via port 3. By way of the NNI protocol, ATM switches 106 and 108 can determine how to communicate with first and second PCS 100 and 102. Thus, after registration, ATM switch 106 can route ATM cells intended for second PC 102 to second ATM switch 108 and ATM switch 108 can route ATM cells intended for first PC 100 to first ATM switch 106.

After registration, if a user at first PC 100 wants to initiate a communication session with second PC 102, then first PC 100 transmits a setup message directed to ATM switch 106 (message 200 is exemplary). Each cell in the setup message includes the virtual connection identifier VPI=0 and VCI=5, which indicates that the cell is a signaling cell. As discussed above, each signaling message also includes a CRN that is unique to the interface connection between first PC 100 and first ATM switch 106. This CRN is assigned by first PC 100 to identify the current call at the local user-network interface. To establish a virtual connection with second PC 102, the setup message includes the ATM address of second PC 102 (i.e., the called party address). The called party address enables first ATM switch 106 to properly route the setup message after interrogating its table of ATM addresses.

In response to the setup request, first ATM switch 106 also selects an available combination of VPI and VCI values to uniquely identify the connection being established with first PC 100 (these values are utilized if the call is eventually established). In other words, first ATM switch 106 assigns a combination of VPI and VCI values that are not already in use for port 1. First ATM switch 106 may enter these tentative VPI and VCI values into its table of virtual connection identifiers. Referring again to FIG. 1, these values for the illustrated example are VPI=10 and VCI=100. If the requested connection is accepted, then first ATM switch 106 may send these VPI and VCI values to first PC 100 in the first connect message in response to the setup message.

Similarly, first ATM switch 106 selects a tentative combination of available VPI and VCI values to identify the current call interface between first and second ATM switches 106 and 108. These values for the example shown in FIG. 1 are VPI=10 and VCI=150. The tentative values may be input into the table maintained at first ATM switch and included in the outgoing setup message that is directed to second ATM switch 108. The setup message is appropriately switched such that it is received at port 4 of second ATM switch 108. Second ATM switch 108 processes the setup message in a similar manner as discussed above, enters the "incoming" VPI and VCI values in an appropriate table, selects an available combination of VPI and VCI values to identify the call connection to second PC 102, enters the "outgoing" values in the table, and switches the setup message such that it is directed to second PC 102 via output port 3. In the illustrated embodiment, the "outgoing" values are VPI=20 and VCI=50 for port 3 of second ATM switch 108.

Upon receipt of the setup message, second PC 102 determines whether or not to accept the connection request. Depending upon the specific application, the ATM address of first PC 100 may be conveyed to second PC 102 to enable second PC 2 to screen its ATM connections. Alternatively, second PC 102 may simply accept new virtual connections if it is capable of handling the additional traffic. If second PC 102 rejects the setup request, or if first PC 100 does not receive a confirmation within a certain time period, then the temporary virtual connection identifier table entry at the various ATM switches (and at first PC 100) is cleared. Control instructions contained in new signaling messages may be used to carry out the clearing function. However, if second PC 102 accepts the setup request, then it may cause an acknowledgment or connect message to be routed to first PC 100 via the appropriate ATM switches. In addition, second PC 102 may validate the VPI and VCI values assigned for the current interface connection between itself and second ATM switch 108. As the connect message is routed through ATM network 104, the various tentative VPI and VCI values are validated to enable the subsequent transmission of information over the virtual connection without reference to the CRNs.

FIG. 3 depicts a typical ATM over ADSL architecture 300 configured in accordance with prior art techniques. As discussed above, ADSL is a physical layer transmission scheme that is deployed at the telephone network level. Thus, although the ADSL physical layer terminates at the ADSL devices, the use of ATM provides an end-to-end broadband transmission architecture. Typically, a residence ADSL device 302 communicates with a central site ADSL device 304 over a local loop 306. The residence ADSL device 302 may be associated with, e.g., a PC 308, while the central site ADSL device 304 may be associated with, e.g., a central office of the public switched telephone network. In accordance with conventional ADSL protocols, local loop 306 may transmit downstream data from ADSL device 304 to ADSL device 302 at 1.5 Mbps or 8.0 Mbps (depending upon the specific operating protocol). The output of central site ADSL device 304 is eventually routed to an ATM switch 310. Although not shown in FIG. 3, a number of similar ADSL devices and local ATM connections may be associated with ATM switch 310.

As shown in FIG. 3, ATM cells are often transmitted to and from ATM switch 310 over high speed links, e.g., OC3 optical fiber connections. Each OC3 link is capable of transmitting data at rates of up to 155 Mbps. Unfortunately, the configuration shown in FIG. 3 does not take full advantage of the high speed capability of the OC3 links because the data transmission speed is limited by the associated local loop 306. Accordingly, an ATM multiplexer may be utilized to enable a single input port on an ATM switch to carry ATM cells associated with a plurality of ATM end devices. However, such an arrangement cannot support UNI 3.1 signaling because the ATM switch would have no way of distinguishing cells that are to be routed to the plurality of ATM end devices. Consequently, a UNI 3.1 compliant architecture that includes an ATM multiplexer must terminate the UNI 3.1 signaling at the multiplexer and initialize additional signaling capabilities. Such additional signaling capabilities complicate the design of the ATM system and increase the associated cost and maintenance.

The "virtual UNI" option in the UNI 4.0 Specification addresses this limitation by allowing signaling cells to be identified by VPI=X and VCI=5, where X can be any one of 256 possible values. Although this solution may appear appropriate, ATM switches that connect to the ATM multiplexer must be compatible with UNI 4.0 and must implement the virtual UNI feature. Furthermore, in the virtual UNI solution, the maximum number of ATM end devices that may be connected to a given ATM switch is 256 (due to the eight bit length of all VPI values). If normal ATM traffic flow is contemplated, the practical capacity of a single OC3 (or OC12) link can handle the multiplexing of more than 256 individual users; the virtual UNI solution would still not take full advantage of the high speed capability of the OC3/OC12 link. Furthermore, the virtual UNI solution requires many signaling connections for each physical link, which adds to the complexity of the ATM switch. For this reason, many ATM switch vendors may be reluctant to implement the virtual UNI option. Thus, due to the practical implications of this solution, it may not be efficiently implemented in ATM over ADSL systems. Some of the above (and other) limitations of prior art systems are mentioned in Kwok, ATM: THE NEW PARADIGM FOR INTERNET, INTRANET AND RESIDENTIAL BROADBAND SERVICES AND APPLICATIONS, chapter 13, the content of which is incorporated herein by reference.

SUMMARY OF THE INVENTION

In accordance with an exemplary embodiment of the present invention, an improved ATM signaling procedure is provided that employs an ATM multiplexer (MUX). The ATM MUX may be configured for compatibility with the UNI 3.1 Specification and/or the UNI 4.0 Specification for ATM signaling. The improved signaling procedure is capable of processing more than 256 ATM end devices via a single ATM switch, and the ATM switch need not be compliant with the UNI 4.0 Specification. The ATM signaling procedure may be implemented in a manner that effectively exploits the high data rate potential of the links associated with the ATM switches. Furthermore, the preferred ATM signaling procedure does not require modifications to the existing UNI 3.1 or UNI 4.0 Specifications.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

FIG. 7 depicts an exemplary table that may be maintained at the ATM MUX;

FIG. 8 depicts an exemplary table that may be maintained at the ATM switch shown in FIG. 4;

DETAILED DESCRIPTION OF A PREFERRED EMBODIMENT

The present invention may be described herein in terms of functional block components and various processing steps. It should be appreciated that such functional blocks may be realized by any number of hardware components configured to perform the specified functions. For example, the present invention may employ various integrated circuit components, e.g., memory elements, digital signal processing elements, logic elements, look-up tables, and the like, which may carry out a variety of functions under the control of one or more microprocessors or other control devices. In addition, those skilled in the art will appreciate that the present invention may be practiced in any number of data communication contexts and that the system described herein is merely one exemplary application for the invention. Further, it should be noted that the present invention may employ any number of conventional techniques for data transmission, signaling, data processing, network control, and the like. Such general techniques that may be known to those skilled in the art are not described in detail herein.

Figures 4, 5:
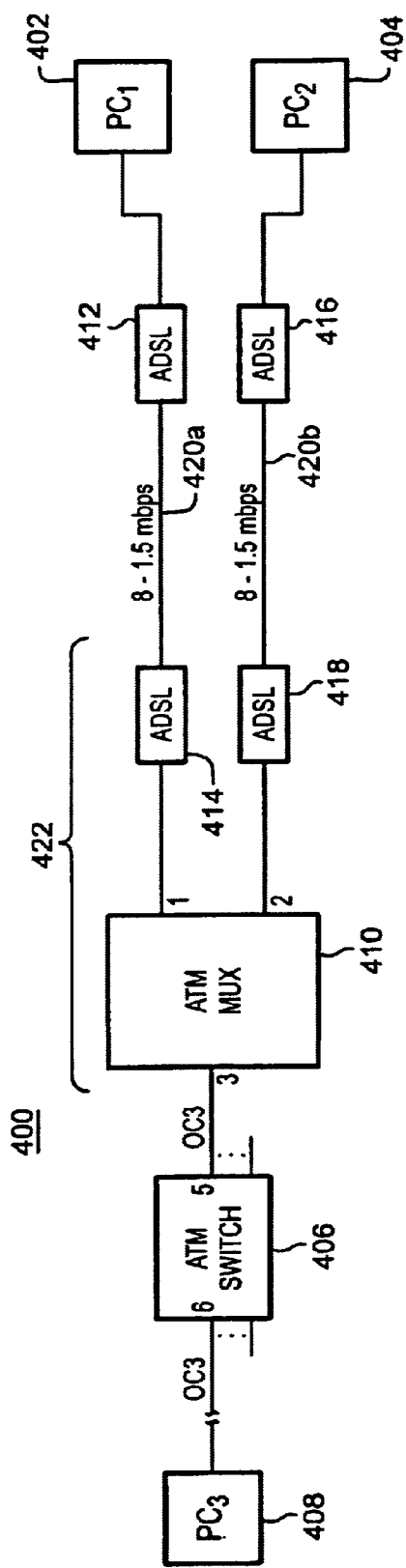
FIG. 4 is a schematic representation of an ATM over ADSL architecture configured in accordance with the present invention.
FIG. 5 depicts an exemplary ATM address table that may be maintained at the ATM MUX shown in FIG. 4.

Referring to FIG. 4, an exemplary ATM over ADSL system 400 is depicted. For the sake of convenience, only a small portion of a practical ATM over ADSL system is shown in FIG. 4. Furthermore, the concepts and features described herein are fully applicable in the context of public ATM networks, private ATM networks, and combined public and private ATM networks. It should be noted that the particular hardware implementations of the various system components may be configured in accordance with any number of known techniques and that the techniques of the present invention may be performed in response to software instructions carried out by one or more hardware components within system 400.

System 400 is preferably configured in accordance with the present invention to enable a plurality of ATM end devices, e.g., a first PC 402 and a second PC 404, to establish virtual connections through a single local ATM switch 406. In the context of the present invention, ATM switch 406 may be configured substantially in accordance with known ATM switching techniques. ATM switch 406 may be physically located at a variety of locations, such as a central office of a local public telephone network or an on-site communications center associated with a private company. ATM switch 406 may be considered to be the first ATM component in the ATM network associated with system 400. In a preferred embodiment, ATM switch 406 is configured with a plurality of input and output ports (a given port may either be an input port or an output port depending upon the transmission direction of the particular ATM message). In a practical implementation, ATM switch 406 may have up to 256 input/output ports.

Figure 1:
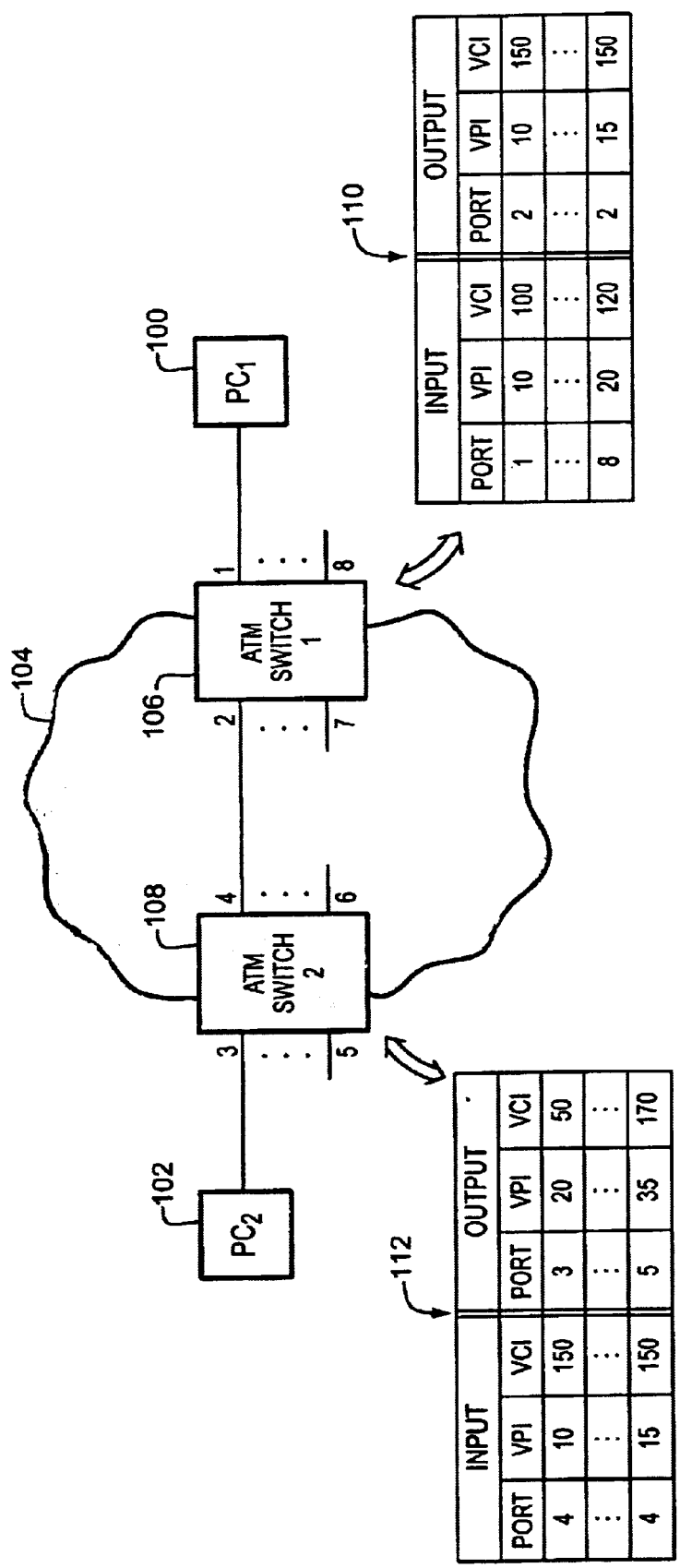
FIG. 1 is a schematic representation of a prior art ATM network and exemplary ATM switching tables.
Figure 2:
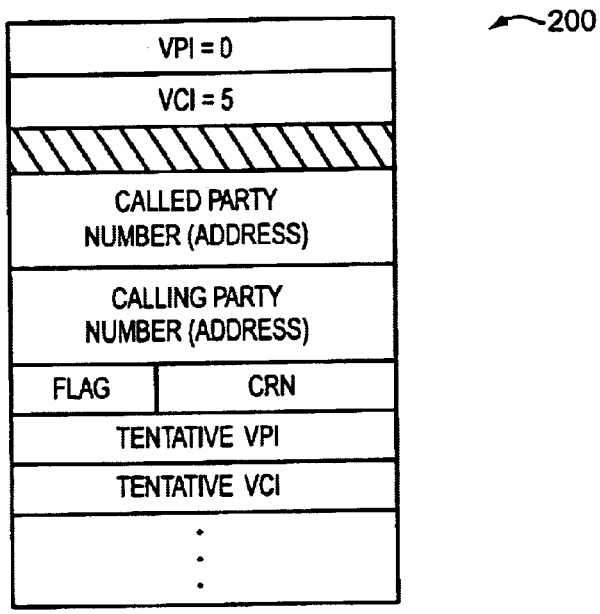
FIG. 2 is a schematic representation of an exemplary ATM signaling message.

ATM switch 406 may include or be operatively associated with a suitable amount of memory storage and data processing capacity to enable it to receive, process, and store signaling information conveyed in ATM signaling messages (such as signaling message 200 shown in FIG. 2). For instance, as described above, ATM switch 406 is preferably configured to perform ATM address registration in accordance with the ILMI protocol, extract, analyze, and modify the VPI and VCI values contained in cell headers, and perform the appropriate switching to route the ATM cells to the appropriate output ports. Furthermore, ATM switch 406 is preferably configured to establish, validate, and clear its virtual connection identifier table entries (see FIG. 1) in response to various signaling commands. In addition to those features described in more detail below, ATM switch 406 may also be designed to perform any number of conventional ATM processes. ATM switches suitable for use in the context of the present invention are commercially available from a variety of manufacturers, including FORE Systems, Cisco Systems, Ascend Communications, and Newbridge Networks.

For the sake of clarity and brevity, a third PC 408 is shown without any intervening ATM switches present after ATM switch 406. Of course, in a more practical implementation, a number of additional ATM switches may be present in system 400. The techniques and concepts described herein in the context of a single ATM switch can be extended to an ATM network having any number of ATM switches, ATM multiplexers, and ATM end devices.

In the illustrated embodiment, first and second PCS 402 and 404 are each operatively coupled to ATM switch 406 via an ATM multiplexer (MUX) 410. The configuration and function of MUX 410 is described in more detail below. Although not a requirement of the present invention, the embodiment shown in FIG. 4 employs ADSL modems to transmit data (using ATM) from first and second PCS 402 and 404 to MUX 410. ADSL and other DSL systems are generally well known in the art; such systems will not be described in detail herein.

Figure 3:
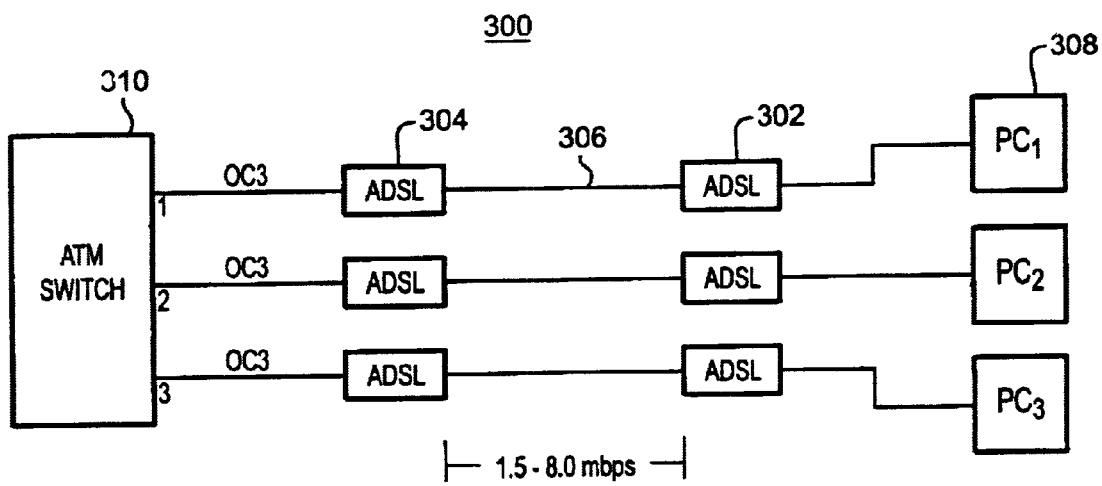
FIG. 3 is a schematic representation of a prior art ATM over ADSL architecture.

The ADSL architecture associated with first PC 402 includes a residence ADSL modem 412 and a central site ADSL modem 414. Similarly, second PC 404 transmits data from a residence ADSL modem 416 to a central site ADSL modem 418. As described above in connection with FIG. 3, residence ADSL modems 412 and 416 may be located at the end users' premises and central site ADSL modems 414 and 418 may be located at, e.g., a central office associates with ATM system 400. In accordance with conventional data communication techniques, ATM system 400 may be configured to operate in conjunction with a "plain old telephone system" (POTS) architecture in a manner that efficiently leverages existing network infrastructures.

As mentioned above, ADSL modem systems transmit data over a local loop 420. Depending upon the length of local loop 420, the data rate supported by the ADSL modems may vary. In particular, if an ADSL modem system is compliant with the currently proposed G.lite Specification (which calls for a maximum local loop length of 18,000 feet), then the highest downstream data rate is about 1.5 Mbps. In contrast, if the maximum local loop length is shortened to 12,000 feet, then a full rate ADSL modem system can support a downstream data rate approaching 8 Mbps. Nonetheless, even if full rate ADSL modems are employed by ATM system 400, resources are wasted because ATM switch 406 is preferably configured to handle a much higher volume of traffic. In other words, the data transmission capacity of ATM system 400 may be significantly hampered by ADSL local loops 420.

In accordance with ATM terminology, MUX 410 may be considered to be an ATM access node, which multiplexes ATM cells for transmission through the ATM network. In a practical embodiment, MUX 410 may be combined with central site ADSL modems 414 and 418 (any number of central site ADSL modems may be combined) to form a digital subscriber line access multiplexer (DSLAM) 422. DSLAM 422 is preferably configured to multiplex the ATM cells transmitted over the ADSL physical layer to ATM switch 406, and to demultiplex the ATM cells in the reverse direction. As described above, DSLAM 422 is typically connected to ATM switch 406 over a single physical link such as an OC3 or OC12 fiber optic line. As shown in FIG. 4, ATM switch 406 may receive ATM cells from any number of DSLAMs or ATM MUXs (each preferably over a devoted connection).

Figure 10:
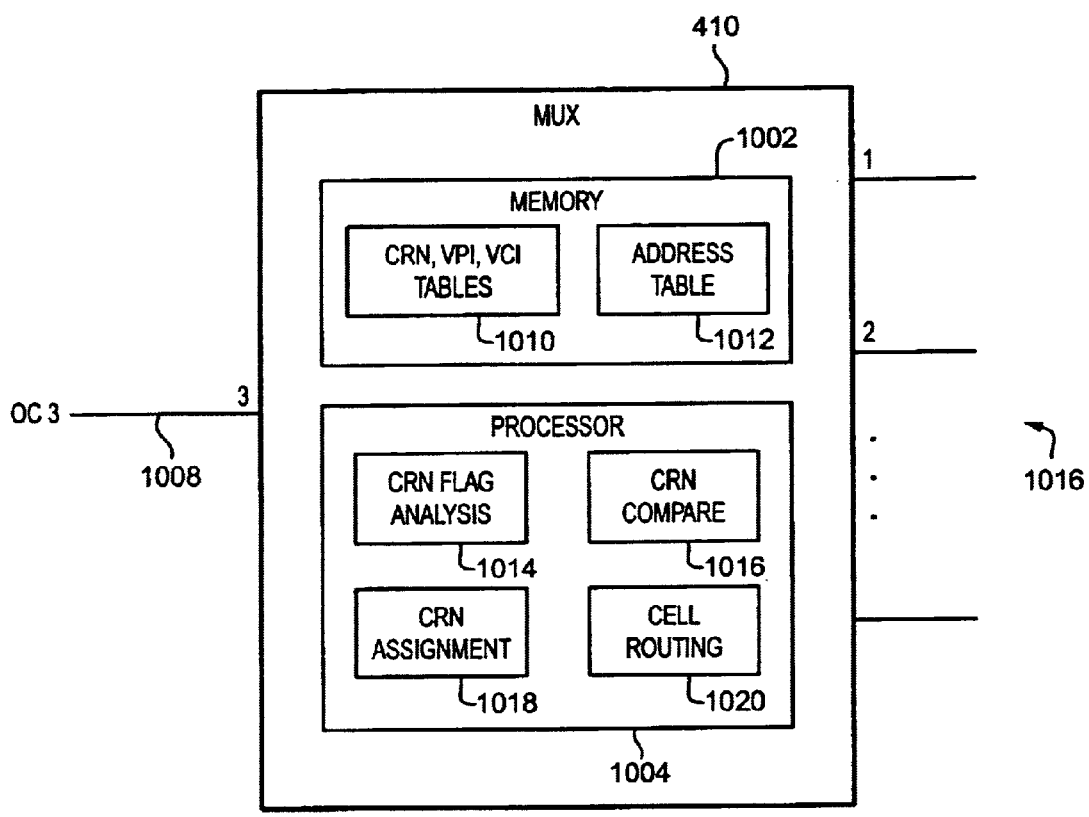
FIG. 10 is a schematic block diagram of an exemplary ATM MUX configured in accordance with the present invention.

FIG. 10 is a schematic representation of MUX 410. In the preferred embodiment, MUX 410 generally includes a memory element 1002, a processor element 1004, a number of downstream ports 1006, and an upstream port 1008. The storage capacity of memory element 1002 and the processing speed and power of processor element 1004 may be suitably configured in accordance with the particular application. Memory element 1002 may include memory space associated with any amount of data. For example, memory element 1002 may include a memory space 1010 for one or more tables associated with CRN, VPI, and VCI values and a memory space 1012 for one or more ATM address tables. The data associated with such tables is described in more detail below.

Processor element 1004 may include, be associated with, and/or control any number of processing modules, functions, or routines. In the preferred embodiment, processor element 1004 controls a CRN flag analysis function 1014, a CRN compare function 1016, a CRN assignment function 1018, and an ATM cell routing function 1020. These and other processes performed by MUX 410 are described in more detail below.

Unlike prior art DSLAM-based systems, system 400 does not require virtual UNI compliance at ATM switch 406. System 400 can operate with only one signaling channel on the physical link between MUX 410 and ATM switch 406; this feature enables MUX 410 to multiplex cells from more than 256 end devices. In addition, in the preferred embodiment, DSLAM 422 need not be modified to perform and terminate UNI 3.1 signaling in order to distinguish first and second PCS 402 and 404 during upstream signaling.

With continued reference to FIG. 4, exemplary signaling procedures in accordance with a preferred embodiment of the present invention will be described in the context of system 400. It should be noted that the procedures described herein may be modified to suit the specific requirements of the particular system. For purposes of the following description, first and second PCS 402 and 404 are considered to be client devices and third PC 408 is considered to be a server device. Accordingly, ATM cells transmitted from first PC 402 or second PC 404 are referred to as upstream cells and ATM cells transmitted from third PC 408 are referred to as downstream cells. In accordance with conventional ADSL techniques, the downstream cells are transmitted over local loops 420 at a higher data rate than the upstream cells.

As discussed above, various elements of ATM system 400 register their respective ATM addresses with one another upon initialization. For example, when the ATM client devices are initialized, they identify their respective ATM user parts to the local ATM switch. In accordance with the UNI 3.1 Specification and the UNI 4.0 Specification, the ATM client devices and other ATM network components employ the ILMI protocol for purposes of address registration. In the exemplary embodiment shown in FIG. 4, first PC 402, second PC 404, third PC 408, MUX 410, and ATM switch 406 utilize the ILMI protocol to enable first PC 402, second PC 404, and third PC 408 to suitably register their addresses with ATM switch 406 via MUX 410. MUX 410 may preferably terminate ILMI and function as an ILMI agent between the client end devices and ATM switch 406. The following description assumes that all three of the PCS are initialized prior to the establishment of any individual virtual connection. ATM address registration techniques and the ILMI protocol are known to those skilled in the art and, thus, are not described in detail herein.

After the ILMI address registration process is complete, ATM switch 406 and MUX 410 each preferably stores the respective ATM addresses of first PC 402, second PC 404, and any additional ATM end devices (not shown) that may be operatively associated with the downstream (i.e., the client side) ports of MUX 410. In addition, ATM switch 406 stores the respective ATM address of third PC 408 and any additional ATM end devices (not shown) that may be operatively coupled to the upstream (i.e., the server side) ports of ATM switch 406. In the preferred embodiment, MUX 410 need not store the upstream ATM addresses because all of the upstream devices are associated with only one upstream port, e.g., port 3. In a preferred embodiment, the various ATM addresses are stored in their full form, i.e., the network prefix and the user part. However, in an alternate embodiment, ATM switch 406 and MUX 410 may only store the ATM user parts of the end devices.

In a practical embodiment, MUX 410 may maintain an ATM address table 500, as shown in FIG. 5. As shown, each downstream client port of MUX 410 is preferably associated with a unique ATM address, i.e., each ATM client device is operatively coupled to one port of MUX 410. Due to the switching capability of ATM switch 406, any number of ATM end devices may be operatively associated with the upstream server port of MUX 410 (illustrated as port 3). In an alternate embodiment, MUX 410 may simply pass the address information to ATM switch 406 rather than store the information in address table 500. As described in more detail below, MUX 410 preferably utilizes CRNs to route signaling cells and the VPI and VCI values to route data cells. Accordingly, since ATM switch 406 includes the intelligence necessary to properly route the ATM cells, MUX 410 need not employ such redundant processing.

The preferred embodiment of the present invention employs the CRNs to identify, multiplex, and demultiplex a large number of signaling messages over one designated signaling channel. The signaling messages may originate from a plurality of downstream end devices that are operatively coupled to MUX 410 or be associated with a number of different applications originating from a single downstream end device.

Figure 6:
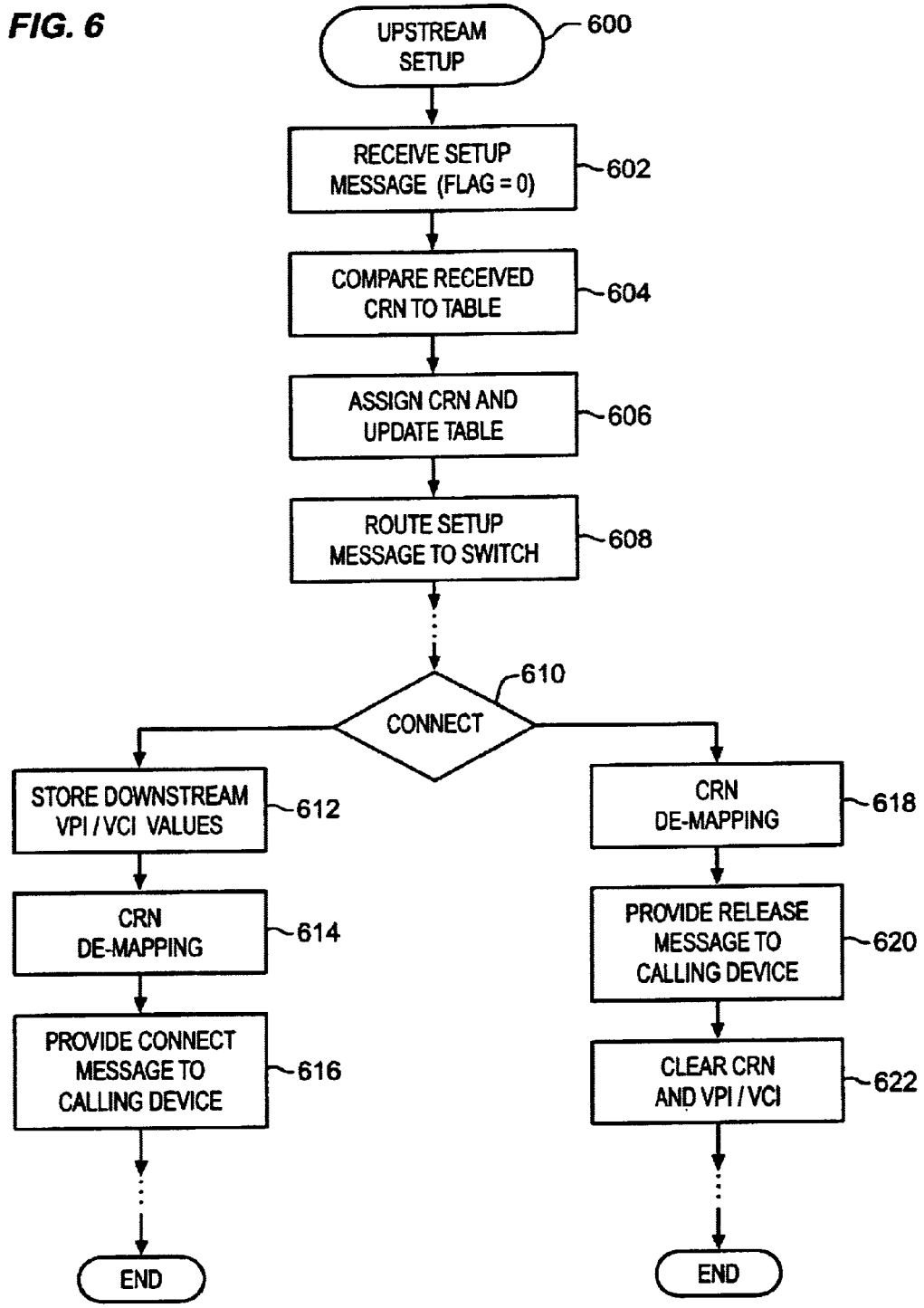
FIG. 6 is a flow diagram of an exemplary upstream setup process that may be performed by the ATM MUX.

Referring now to FIG. 6, an exemplary upstream setup process 600 associated with MUX 410 is illustrated as a flow diagram. With continued reference to FIG. 4, process 600 is preferably performed by MUX 410 in response to a setup request initiated by a downstream client device, e.g., first PC 402. As described above, each cell in a UNI 3.1 setup request will include VPI=0 and VCI=5 to identify itself as a signaling cell and each cell in a UNI 4.0 setup message will include VCI=5 to identify itself as a signaling cell. For convenience, process 600 is described in the context of UNI 3.1 signaling; the techniques described herein are also applicable in the context of UNI 4.0 signaling. MUX 410 may need to implement AAL 5 and act as an SSCOP agent between PC 402 and PC 404 and ATM switch 406.

The setup message will also include at least a CRN selected by first PC 402, the ATM address of the destination device, and a suitable CRN flag. The CRN flag may be considered to be a part of the CRN, e.g., the CRN may be 24 bits long and the CRN flag may utilize one of the 24 bits. As noted above, in a preferred practical embodiment, the CRN flag has a value of 0 because first PC 402 (rather than an ATM switch) originated the setup message, i.e., first PC 402 is a calling device rather than a called device. In practice, MUX 410 may analyze the CRN flag for each signaling cell such that it can determine the origin of the signaling cell and/or how to process the signaling message. Process 600 may begin with a task 602, during which MUX 410 receives the setup message.

In response to the zero state of the CRN flag, MUX 410 preferably analyzes the received CRN to determine whether the same CRN has been previously received from a different downstream device via another input port. In other words, MUX 410 determines whether the initial CRN is being concurrently utilized to identify a different downstream device or a different virtual connection with first PC 402. To this end, MUX 410 may suitably compare the received CRN to a number of entries stored in an appropriate CRN table (task 604). FIG. 7 depicts an exemplary CRN table 700 that may be maintained by MUX 410. CRN table 700 preferably stores a number of in-use CRNs that identify current connections between MUX 410 and specific downstream devices. If MUX 410 determines that the received CRN is not currently associated with another downstream device, then it will retain the received CRN for the current setup message. MUX 410 may also update its CRN table to reflect that no mapping or translation is necessary for that CRN. The first vertical entry in table 700 depicts such a situation (the received CRN and the assigned CRN are the same).

If, however, MUX 410 determines that the received CRN has already been designated to identify another downstream device connected via a different port, then MUX 410 preferably assigns a new CRN to identify the current connection (task 606). To avoid ambiguities, MUX 410 assigns a CRN that has not been previously assigned (thus, in the context of this description, the CRN assigned by first PC 402 may be considered to be the initial CRN, and MUX 410 may change the initial CRN to the new CRN during task 606). MUX 410 may also update its CRN table to reflect the relationship between the received CRN and the newly assigned CRN. The table may be suitably configured to make an association between the initial CRN, the new CRN, and the current input port of MUX 410. The last vertical entry of table 700 depicts a situation where the received CRN has been reassigned. In this example, CRN=130 was previously received in a message on port 2. Accordingly, when 130 is received as the CRN in a message on port 1, MUX 410 changes the CRN value to 180 (note that this CRN value was not previously used). This example will be referred to below.

The unique assignment of CRNs by MUX 410 ensures that MUX 410 can properly demultiplex the signaling messages from ATM switch 406 to the downstream devices even though all of the downstream devices may be using the same signaling channel (e.g., VPI=0 and VCI=5). Accordingly, unlike the prior art virtual UNI solution, which is limited to 256 concurrent end users, MUX 410 is capable of handling $2^{23}$ virtual connections that may be shared by the downstream devices. The 23-bit capacity is derived from the three byte length of the CRN, with one bit reserved for the CRN flag. The large number of possible CRN values ensures that, for all practical purposes, MUX 410 can support many more than 256 concurrent end users and the capacity of MUX 410 will far exceed the end user demands of system 400.

A task 608 may be performed to cause MUX 410 to suitably route the setup message (which may contain a translated CRN) to ATM switch 406 over, e.g., an OC3 fiber optic link. Task 608 requires no intelligence at MUX 410 because, in the preferred embodiment, MUX 410 is connected to one switch on port 3. After the setup message leaves MUX 410, it may be processed in a conventional manner by ATM switch 406 and third PC 408. Indeed, the present invention is particularly suitable for implementation in existing ATM networks because modifications could be limited to DSLAM 422.

ATM switch 406 eventually receives the setup message on, e.g., its port 5, and identifies the setup message as a signaling message (i.e., the cells include VPI=0 and VCI =5). In response to the setup message, ATM switch performs the following functions:

1. CRN Assignment—ATM switch 406 changes the received CRN to a new value that will uniquely identify the connection between third PC 408 and ATM switch 406. In the above example, ATM switch 406 may change the received CRN of 180 (which was selected by MUX 410) to an assigned CRN of 846. In accordance with conventional protocols, ATM switch 406 changes the CRN flag to 1. An appropriate table 800 may be updated to reflect the CRN mapping and the respective downstream and upstream ports (see FIG. 8).

2. Called Address Analysis—ATM switch 406 analyzes the called party address contained in the setup message and determines the proper upstream port associated with that address. ATM switch 406 interrogates the address table generated during the ILMI registration procedure to determine the appropriate upstream port.

3. Downstream VPI/VCI Selection—ATM switch 406 chooses an available combination of VPI and VCI values that are to be used if the connection is eventually established. For example, ATM switch 406 may tentatively designate VPI=18 and VCI=165 to identify the interface between first PC 402 and ATM switch 406. These values may be stored in table 800.

4. Upstream VPI/VCI Selection—ATM switch 406 chooses an available combination of VPI and VCI values to uniquely identify the interface between third PC 408 and ATM switch 406. In table 800, VPI=30 and VCI=154 are employed for the current example. These upstream VPI and VCI values are included in the setup message for transmission to third PC 408.

5. Switching/Routing—ATM switch 406 eventually directs the modified setup message such that it is made available on the appropriate output port. In the illustrated example, the setup message is output on port 6.

As described above, FIG. 4 does not show any intervening ATM switches between ATM switch 406 and third PC 408. However, a practical system will likely include at least one additional intervening ATM switch. The functions and signaling features described above may be suitably extended to any number of intervening switches.

Upon receipt of the setup message, third PC 408 will determine whether or not to accept the connection request. As described above, the setup message may include the calling party address, which may be used by third PC 408 during its determination. In response to the setup request, third PC 408 typically replies with either a connect message or a release message. If third PC 408 accepts the connection, then it will validate the tentative VCI and VPI values (e.g., VPI=30 and VCI=154) provided by ATM switch 406 and enter such values in an appropriate table maintained at third PC 408. The connect message is thereafter routed to ATM switch 406; the appropriate CRN value (the same CRN value sent by ATM switch 406) is utilized for this connect message to facilitate the proper routing of the message. At this time, CRN FLAG=1 because third PC 408 is not a calling device and because the CRN provided by ATM switch 406 will include CRN FLAG=1. In response to the connect message, ATM switch 406 will validate the tentative upstream and downstream VCI and VPI values, change the CRN (e.g., from 846 to 180) (see FIG. 8), and add the downstream VPI and VCI values (e.g., VPI=18 and VCI= 165) into the connect message for transmission back to MUX 410 and first PC 402.

If, however, third PC 408 rejects the connection request, then it will generate an appropriate release message (which includes the CRN that identifies ATM switch 406). After the release message is transmitted, third PC 408 clears the CRN value for that setup request. The release message is thereafter routed back to ATM switch 406. In response to the release message, ATM switch 406 will clear the tentative VPI and VCI values (upstream and downstream), change the CRN to the appropriate downstream CRN, and route the release message back to MUX 410. After switching the release message, ATM switch 406 suitably clears the CRN values associated with the released call.

Referring again to FIG. 6, MUX 410 may eventually perform a query task 610, which determines whether a connect message has been received. If MUX 410 receives a connect message, then it may perform a task 612 to suitably access and store the downstream VPI and VCI values generated by ATM switch 406. The last vertical entry in table 700 includes the downstream VPI and VCI values utilized in the current example. A task 614 may be performed to de-map the current CRN value (if necessary). Referring to FIG. 7, the connect message received by MUX 410 from ATM switch 406 has the CRN value of 180. Thus, MUX 410 performs task 614 by changing the CRN back to 130. In practice, MUX 410 may consult a lookup table or a suitable memory element during task 614.

A task 616 is preferably performed such that MUX 410 sends the connect message to the proper originating device, e.g., first PC 402. As shown in table 700, the assigned CRN of 180 is uniquely associated with the first port of MUX 410. Thus, task 614 may also indicate that the de-mapped CRN value of 130 is associated with port 1. Thereafter, task 616 makes the connect message available on port 1 for communication to first PC 402. At this point, the exemplary connect message employs VPI=0, VCI=5, CRN=130, and CRN FLAG=0. The connect message includes the tentative VPI value of 18, and the tentative VCI value of 165. Note that CRN FLAG=0 because first PC 402 is the calling device. After the connect message is sent to first PC 402, upstream setup process 600 ends. The connect message will eventually be received and suitably processed by first PC 402. In particular, first PC 402 validates the tentative VPI and VCI values such that those values are used to identify the unique connection between first PC 402 and ATM switch 406 (via MUX 410). The CRN value is maintained for signaling purposes, and first PC 402 may proceed to communicate data cells to ATM switch 406 via the virtual connection identifiers VPI=18 and VCI=165.

If query task 610 determines that the current call is not to be connected, then a task 618 may be prompted. Task 618 may be performed if MUX 410 receives a release message generated by the called device (e.g., third PC 408). Task 618 may also be performed if MUX 410 does not receive a connect message or a release message after a predetermined period of time (or after a predetermined number of connection attempts). Like task 614, task 618 is preferably performed to de-map the received CRN (if necessary) into the appropriate value associated with first PC 402. Assuming a release message is received by MUX 410, after the CRN de-mapping, a task 620 causes the release message to be provided to the calling device, e.g., first PC 402. As with task 616, task 620 may be performed by MUX 410 to suitably route the release message to port 1 of MUX 410.

A task 622 may be performed after the release message leaves MUX 410. In the preferred embodiment, task 622 causes MUX 410 to clear the current CRN values (the actual and assigned values) associated with the current connection with first PC 402. In addition, task 622 may cause MUX 410 to clear the tentative VPI and VCI values assigned to MUX 410 by ATM switch 406 (see above description of the role played by ATM switch 406 during process 600). Thus, following task 622, the last vertical entry in table 700 would be erased from memory. Of course, task 622 (or portions thereof) may be suitably performed at any time in accordance with conventional signaling procedures.

In response to a release message, first PC 402 may clear the respective CRN value from its memory and make that CRN value available for use with a new setup message.

Upstream setup process 600 may be utilized to enable system 400 to efficiently establish virtual connections between a plurality of client end devices that are connected to a ATM switch via a single communication link. The use of assigned CRN values (or any suitable identification scheme) facilitates unambiguous downstream communications between ATM switch 406 and the downstream devices via MUX 410.

Figure 9:
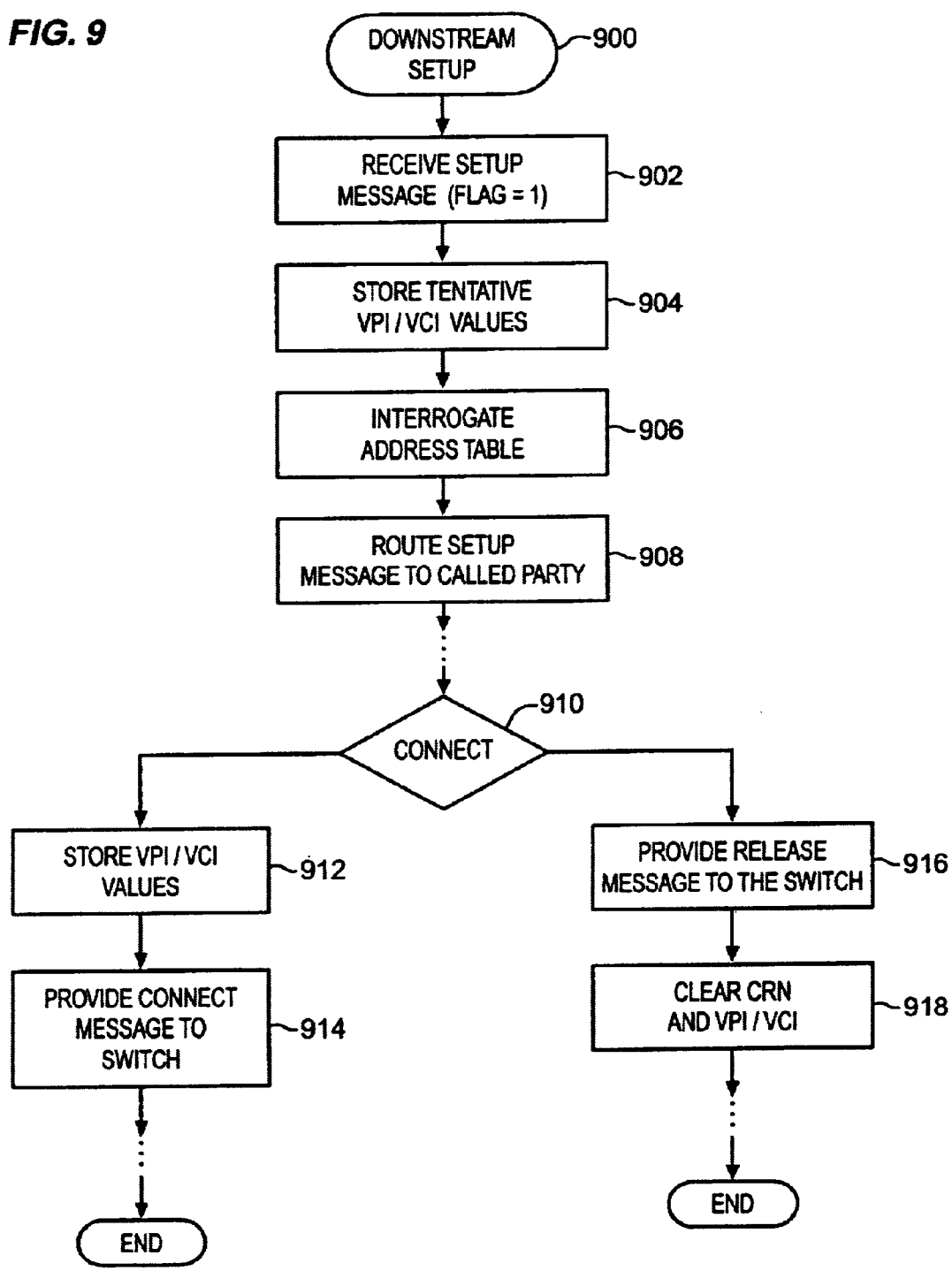
FIG. 9 is a flow diagram of an exemplary downstream setup process that may be performed by the ATM MUX.

System 400 may also be configured to handle downstream setup messages that originate from, e.g., third PC 408. FIG. 9 depicts a flow diagram of an exemplary downstream setup process 900 that may be performed by MUX 410 in response to such downstream setup messages. As described above, each cell in a UNI 3.1 downstream setup message will include VPI=0 and VCI=5 to identify itself as a signaling message. The downstream setup message will also include at least a CRN assigned by third PC 408, the ATM address of the destination device, and, in the preferred embodiment, a CRN flag of 0.

Before MUX 410 receives the downstream setup message, ATM switch 406 processes the message in an appropriate manner. Specifically, ATM switch 406 preferably performs the following functions (some of which are described above):

1. Assign a new CRN, change the CRN flag to 1, and update its CRN table.
2. Analyze the called party address to determine the proper downstream output port.
3. Select an available combination of VPI and VCI values that are to be used by third PC 408 if the connection is eventually established, and store the tentative values in its table.
4. Select an available combination of VPI and VCI values to uniquely identify the interface between the destination device and ATM switch 406, store the tentative values in its table, and include the tentative values in the downstream setup message.
5. Switch to make the downstream setup message available on the appropriate output port. In this example, the output port (port 5) is connected to MUX 410 via a devoted OC3 line.

Referring again to FIG. 9, Process 900 may begin with a task 902, during which MUX 410 receives the setup message. When MUX 410 receives the downstream setup message, the CRN flag has a value of 1 because ATM switch 406 changes the CRN flag from 0 to 1. In practice, MUX 410 may analyze the CRN flag for each signaling cell such that it can determine how to process the signaling message.

In response to the "one" state of the CRN flag, MUX 410 is informed that the received CRN is unique with respect to ATM switch 406. In other words, because MUX 410 is connected to ATM switch 406 via a single connection, MUX 410 will not receive duplicate CRNs from ATM switch 406. MUX 410 maintains a table of the CRN values to facilitate the processing of subsequent signaling messages.

A task 904 may be suitably performed to store the tentative VPI and VCI values at MUX 410. As described above, these values are selected by ATM switch 406 to uniquely identify the tentative downstream connection. In the context of this description, ATM switch 406 need not be informed that MUX 410 is connected between it and the downstream destination devices. Consequently, ATM switch 406 assigns the tentative VPI and VCI values as if it were directly coupled to an end device (or another switch).

In the preferred embodiment, MUX 410 suitably interrogates its address table (see FIG. 5) to determine which, if any, of its downstream ports is associated with the ATM address contained in the downstream setup message. After MUX 410 determines the appropriate port, a task 908 is performed to route the downstream setup message to the called destination device.

Upon receipt of the downstream setup message, first PC 402 will determine whether or not to accept the connection request. As described above in connection with upstream setup process 600, first PC 402 will typically reply with either a connect message or a release message. If first PC 402 accepts the connection, then it will validate the tentative VCI and VPI values provided by ATM switch 406 and enter such values in an appropriate table. A connect message is thereafter routed back to MUX 410; the appropriate CRN value is included in this connect message to facilitate the proper routing of the message.

If, however, first PC 402 rejects the connection request, then it will generate an appropriate release message (which uses the CRN that identifies ATM switch 406). If a release message is sent, first PC 402 need not store the CRN, VPI, or VCI values contained in the downstream setup message. The release message is thereafter routed back to MUX 410 for further processing.

Referring again to FIG. 9, MUX 410 may perform a query task 910 to test whether a connection is to be established. Query task 910 may be responsive to the receipt of a connect message or a release message generated by first PC 402. If a connection is to be established, then a task 912 is preferably performed by MUX 410 to suitably validate the tentative VPI and VCI values (associated with first PC 402) stored in its memory. Thereafter, a task 914 is performed to suitably provide the connect message to ATM switch 406. ATM switch 406 and third PC 408 may then process the connect message in a conventional manner to validate the respective VPI and VCI values and to establish the virtual connection between third PC 408 and first PC 402.

If, however, query task 910 determines that a connection is not to be established (e.g., a release message is received or a timeout period elapses), then a task 916 may be prompted. Assuming a release message has been received by MUX 410, task 916 may be performed to make the release message available on the upstream port of MUX 410 (e.g., port 3). As described above, task 916 requires very little intelligence because, in the preferred embodiment, only one upstream port is utilized between MUX 410 and ATM switch 406.

A task 918 may be performed after the release message leaves MUX 410. In the preferred embodiment, task 918 causes MUX 410 to clear the current CRN value associated with the current connection between ATM switch 406 and first PC 402. In addition, task 918 may cause MUX 410 to clear the tentative VPI and VCI values assigned to MUX 410 by ATM switch 406. The release message may thereafter be processed by ATM switch 406 and third PC 408 in a conventional manner such that the CRN, VPI, and VCI values are freed up for subsequent use during the next setup process.

In summary, the present invention provides an improved ATM signaling procedure that employs an ATM MUX. The MUX may be configured for compatibility with the UNI 3.1 Specification and/or the UNI 4.0 Specification for ATM signaling. The improved signaling procedure is capable of processing more than 256 ATM end devices via a single ATM switch, and the ATM switch need not be compliant with the UNI 4.0 Specification. For upstream setup messages, the MUX is preferably configured to enable it to handle a plurality of concurrent setup messages from different downstream end devices in an elegant and efficient manner. Accordingly, the ATM signaling procedure may be implemented in a manner that effectively exploits the high data rate potential of the connecting links associated with the ATM switches.

The present invention has been described above with reference to a preferred embodiment. However, those skilled in the art will recognize that changes and modifications may be made to the preferred embodiment without departing from the scope of the present invention. For example, the specific CRN, VPI, and VCI values, port numbers, and table formats are used herein for the sake of illustration and are not intended to limiting in any manner. In addition, the techniques described herein may be extended to more complex systems that utilize cross connects and/or other intervening components that may require one or more translations associated with the CRN, VPI, or VCI values. Furthermore, the processes described herein may be equivalently performed with alternate or additional tasks and the process tasks may be performed in a different order than that described herein. These and other changes or modifications are intended to be included within the scope of the present invention, as expressed in the following claims.

What is claimed is:

1. A method of multiplexing a plurality of asynchronous transfer mode (ATM) end devices to an ATM switch of an ATM network, said method comprising the steps of:

receiving an ATM message in a multiplexer (MUX) of said ATM network, said MUX including a single connection to said ATM switch and one or more connections to one or more corresponding ATM end devices;

comparing a call reference number (CRN) included in said ATM message to currently existing CRNs stored in said MUX; and routing said ATM message through said MUX to another ATM network device based on said CRN;

wherein said CRN uniquely identifies said ATM message and uniquely identifies a particular ATM end device that originated said ATM message.

2. The method of claim 1, wherein said CRN is generated by said particular ATM end device.

3. The method of claim 1, wherein said CRN comprises a CRN flag and wherein said method further comprises the step of examining said CRN flag to determine the origin of said ATM message, said examining step being performed by said MUX.

4. The method of claim 1, further comprising the steps of:

obtaining a virtual connection identifier from said ATM switch, with said virtual connection identifier comprising a virtual path identifier (VPI) and a virtual circuit identifier (VCI); and storing said virtual connection identifier at said MUX in response to a connect message received from said ATM switch.

5. The method of claim 1, further comprising the step of said MUX verifying said CRN.

6. The method of claim 1, wherein said ATM message comprises an ATM setup message and with the method further comprising the steps of:

analyzing said CRN to determine whether said CRN is being concurrently utilized by said MUX to identify a different ATM end device;

assigning a new CRN to said ATM setup message; and associating said new CRN to a particular connection port of said MUX corresponding to said particular ATM end device if said CRN is being concurrently utilized by said MUX to identify said different ATM end device.

7. An asynchronous transfer mode multiplexer (ATM MUX) for use in an ATM network and interposed between a plurality of downstream devices and an ATM switch, said ATM MUX comprising:

a plurality of downstream ports, with each downstream port capable of being operatively coupled to one of said plurality of downstream devices;

an upstream port capable of being operatively coupled to said ATM switch;

a memory storing in-use call reference numbers (CRNs) that identify current connections between said ATM MUX and specific downstream devices; and a processor configured to obtain from said memory an initial CRN included in a received ATM message originating from a particular downstream device, to compare said initial CRN with said in-use CRNs, and to assign a new CRN to said ATM message and to said particular downstream device if said initial CRN is being concurrently utilized by said ATM MUX to identify a different downstream device.

8. The MUX of claim 7, wherein said upstream port of said MUX is operatively coupled to said ATM switch by a fiber optic line.

9. The MUX of claim 7, wherein said MUX is included in a digital subscriber line access multiplexer (DSLAM).

10. A method of multiplexing a plurality of ATM end devices to an ATM switch in an asynchronous transfer mode (ATM) system, said method comprising the steps of:

receiving in a multiplexer (MUX) an ATM setup message from a particular ATM end device, said MUX including a single connection to said ATM switch and a plurality of connections to said plurality of ATM end devices, and with said ATM setup message including an initial call reference number (CRN);

comparing said initial CRN to in-use CRNs stored in said MUX, with said initial CRN being generated by said particular ATM end device;

generating and storing a new CRN for said ATM setup message and said particular ATM end device if said initial CRN is being concurrently utilized by said MUX to identify a different ATM end device; and routing said ATM setup message through said MUX to said ATM switch;

wherein said initial CRN or said new CRN uniquely identifies said particular ATM end device and said ATM setup message.

11. The method of claim 10, further comprising the steps of:

obtaining a virtual connection identifier from said ATM switch, with said virtual connection identifier comprising a virtual path identifier (VPI) and a virtual circuit identifier (VCI); and storing said virtual connection identifier at said MUX in response to a connect message received from said ATM switch.

12. The method of claim 10, wherein the step of generating and storing said new CRN further comprises associating said new CRN to a particular connection port of said MUX corresponding to said particular ATM end device.

* * * * *